(12) United States Patent
Kim

(10) Patent No.: US 8,548,032 B2
(45) Date of Patent: Oct. 1, 2013

(54) METHOD OF DETECTING A RADAR SIGNAL, RADAR DETECTION MODULE, AND WIRELESS TRANSCEIVER INCLUDING THE SAME

(75) Inventor: Ji Tae Kim, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 265 days.

(21) Appl. No.: 12/971,303

(22) Filed: Dec. 17, 2010

(65) Prior Publication Data

US 2011/0150053 A1    Jun. 23, 2011

(30) Foreign Application Priority Data

Dec. 17, 2009   (KR) .................. 10-2009-0126075

(51) Int. Cl.
*H04K 3/00* (2006.01)

(52) U.S. Cl.
USPC ........... 375/219; 375/316; 375/267; 375/259; 375/260; 375/346; 375/249; 375/350; 455/67.13; 455/63.1; 455/63.3; 455/71

(58) Field of Classification Search
USPC ................ 375/219, 316, 267, 259, 260, 346, 375/249, 350; 455/67.13, 63.1, 63.3, 71
See application file for complete search history.

(56) References Cited

U.S. PATENT DOCUMENTS

| | | | |
|---|---|---|---|
| 7,129,884 B1 * | 10/2006 | Tehrani et al. ................. | 342/20 |
| 7,834,800 B1 * | 11/2010 | Chhabra et al. ................ | 342/20 |
| 2004/0201517 A1 * | 10/2004 | MacFarlane Shearer, III ............................... | 342/159 |
| 2007/0135057 A1 * | 6/2007 | Nallapureddy et al. ... | 455/67.13 |
| 2007/0281638 A1 * | 12/2007 | Hansen ..................... | 455/127.4 |
| 2009/0160696 A1 * | 6/2009 | Pare et al. ..................... | 342/20 |

* cited by examiner

*Primary Examiner* — Siu Lee
(74) *Attorney, Agent, or Firm* — Lee & Morse, P.C.

(57) ABSTRACT

A method and apparatus for detecting a radar signal is provided. The method includes collecting a plurality of pulses based on a reference time or a reference pulse collection count, classifying the plurality of pulses into groups based on similarity of pulse widths, classifying the groups into a short-pulse type and a long-pulse type and calculate the number of groups in each type, and determining whether a radar signal exists based on a number of groups in each type.

8 Claims, 14 Drawing Sheets

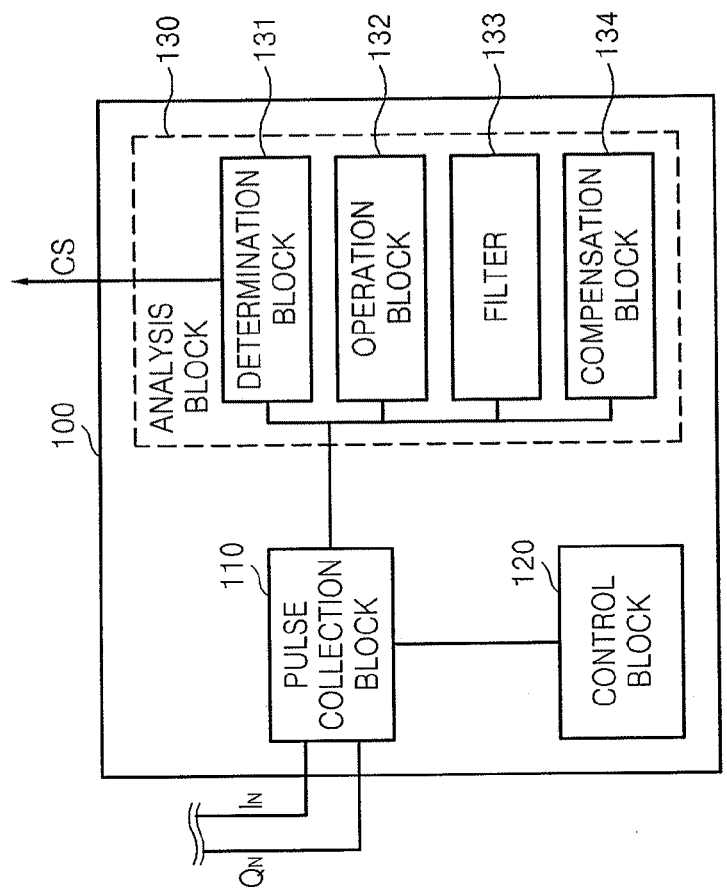

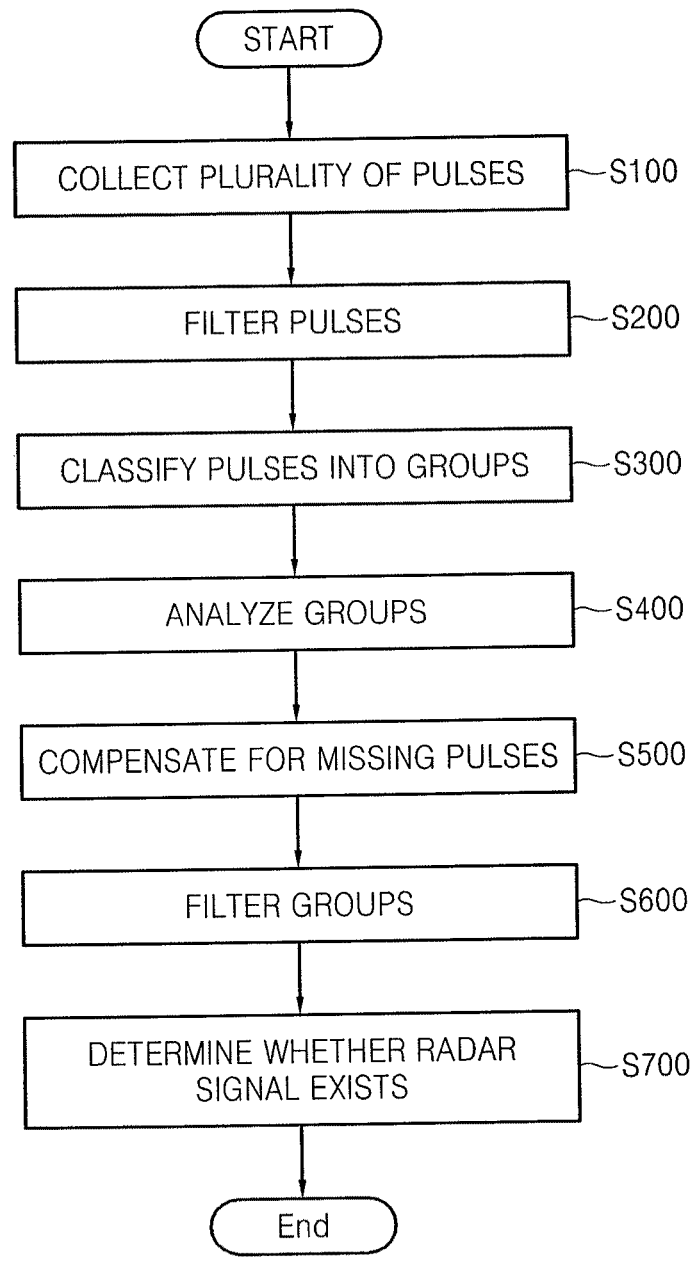

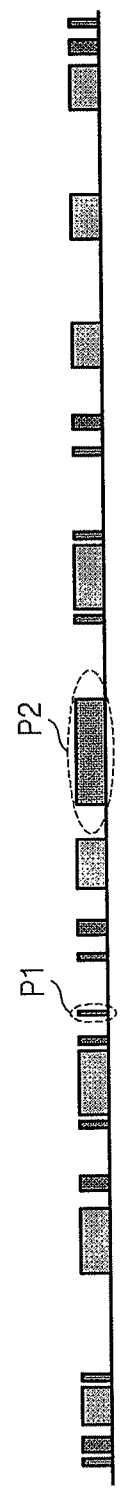

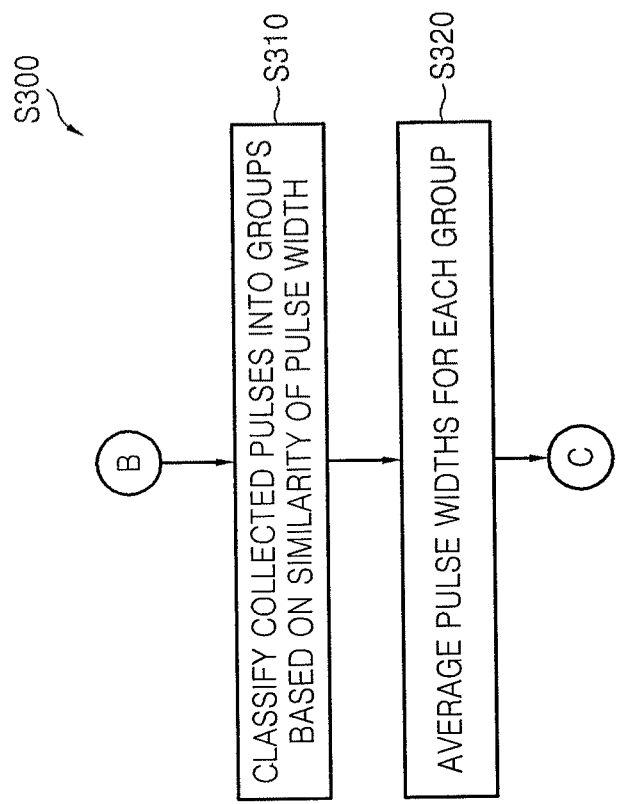

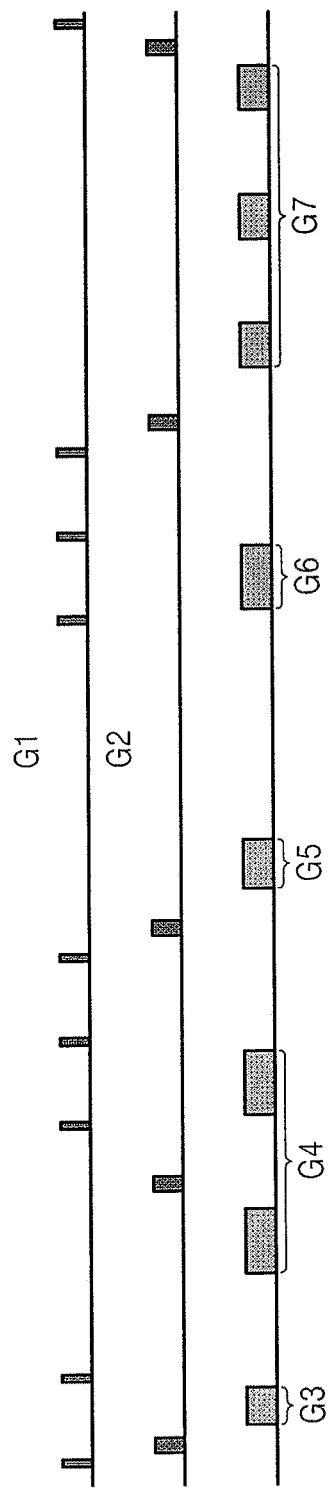

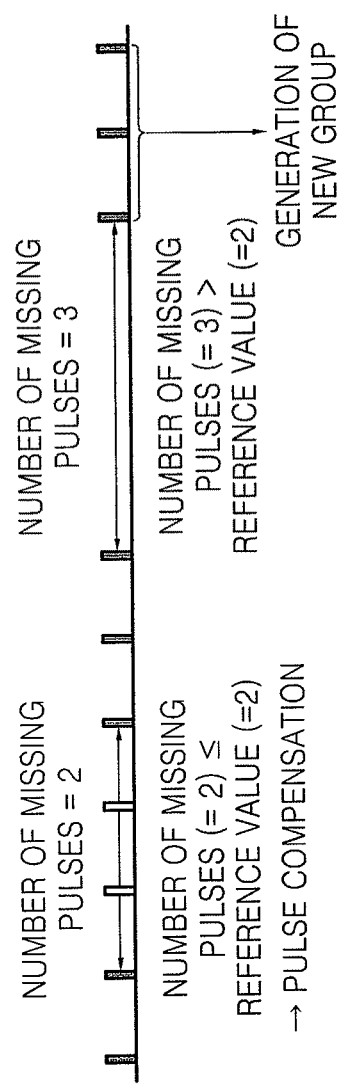

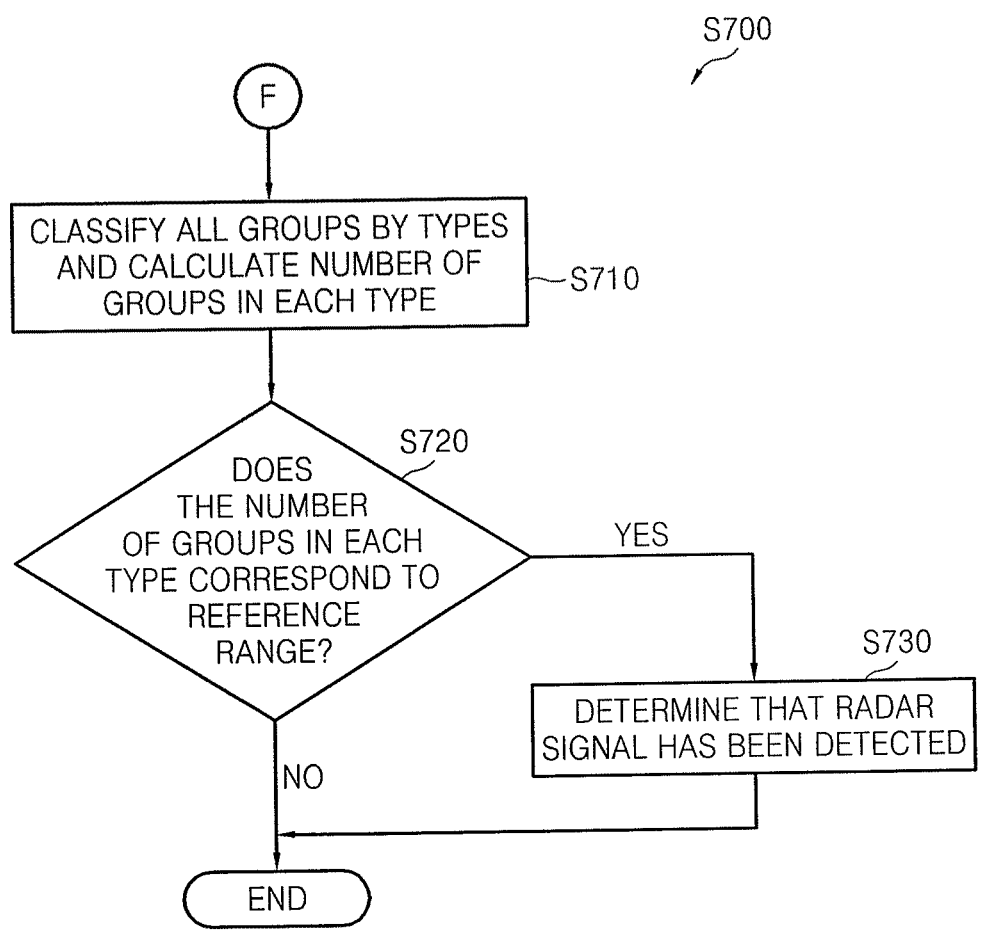

METHOD OF DETECTING A RADAR SIGNAL, RADAR DETECTION MODULE, AND WIRELESS TRANSCEIVER INCLUDING THE SAME

BACKGROUND

1. Field

Embodiments relate to a method of detecting a radar signal, a radar detection module, and a wireless transceiver including the same, and more particularly, to a method of detecting a radar signal by analyzing the pattern of radar pulses using a pulse width and a pulse repetition interval.

2. Description of the Related Art

With the advancement of communication technology, various types of wireless communication have been used in order to overcome the inconvenience of wired communication, which always requires lines for communication. A wireless local area network (WLAN) by an Institute of Electrical and Electronics Engineers (IEEE) 802.11 family has prominently emerged. The IEEE 802.11 family includes 802.11a, 802.11b, 802.11g, and 802.11n. Of those, the 802.11a standard uses orthogonal frequency division multiplexing (OFDM) and operates in the 5 GHz band.

However, the 5 GHz band has already been used for military radars, weather observation, wireless navigation, and satellite radars. Therefore, the European Telecommunications Standard Institute (ETSI) and the Federal Communications Commission (FCC) as well as the International Telecommunications Union-Radiocommunications (ITU-R) are aware of the significant influence of WLANs on radar signals and use dynamic frequency selection (DFS) and transmit power control (TPC) to minimize the influence on the radar signals.

The DFS is a method of detecting a radar signal, avoiding a channel containing a radar, and resuming communication through a new channel and is defined in the IEEE 802.11h standard. While the IEEE 802.11h standard may define a mechanism of notifying elements of a network after detecting a radar signal, the IEEE 802.11h standard does not include details about how to actually detect the radar signal.

SUMMARY

One or more embodiments may provide a method and apparatus for detecting a radar signal.

One or more embodiments may provide a method and apparatus for detecting a radar signal by analyzing the pattern of radar pulses using a pulse width and a pulse repetition interval.

One or more embodiments may provide a specified method and apparatus for detecting a radar signal employable with the IEEE 802.11h standard.

One or more embodiments may provide a method and apparatus for detecting a radar signal using analysis of received pulses.

One or more embodiments may be realized by providing a method of detecting a radar signal, the method including collecting a plurality of pulses based on a reference time or a reference pulse collection count, classifying the plurality of pulses into groups based on pulse widths of the plurality of pulses, classifying the groups into a short-pulse type and a long-pulse type and calculating a number of groups in each type, and determining whether a radar signal exists based on the number of groups in each type.

The method may include filtering the plurality of pulses according to a pulse filtering reference before classifying the plurality of pulses into the groups, and analyzing pulses in each of the groups after classifying the plurality of pulses into the groups.

The method may include compensating for missing pulses in each group based on the analysis of the pulses in each group.

The method may include generating a new group based on the analysis of the pulses in each group.

The method may include averaging pulse widths for each of the groups after the classifying the plurality of pulses into the groups based on similarity of the pulse widths of the pulses.

Analyzing the pulses in each of the groups may include analyzing the pulses based on the number of missing pulses in each group.

Analyzing the pulses in each of the groups may include analyzing the pulses based on a pulse repetition interval of radar regulation pulses.

The method may include filtering the groups, into which the plurality of pulses are classified into based on similarity of the pulse widths, according to a group filtering reference.

One or more embodiments may be realized by providing a method of detecting a radar signal, the method including collecting a plurality of pulses based on a reference time or a reference pulse collection count, filtering the plurality of pulses according to a pulse filtering reference, classifying the filtered pulses into groups based on similarity of pulse width, filtering the groups according to a group filtering reference, classifying the filtered groups into a short-pulse type and a long-pulse type and calculate the number of groups in each type, and determining whether a radar signal exists based on the number of groups in each type.

One or more embodiments may be realized by providing a non-transitory recording medium for recording a computer program for executing a method of detecting a radar signal, the method including collecting a plurality of pulses based on a reference time or a reference pulse collection count, classifying the plurality of pulses into groups based on pulse widths of the plurality of pulses, classifying the groups into a short-pulse type and a long-pulse type and calculate a number of groups in each type, and determining whether a radar signal exists based on the number of groups in each type.

One or more embodiments may be realized by providing a radar signal detection module, including a pulse collection block configured to collect and store a plurality of pulses, a control block configured to control the pulse collection block to collect the plurality of pulses based on a reference time or a reference pulse collection count, and an analysis block configured to classify the plurality of pulses into groups based on pulse widths of the pulses, classify the filtered groups into a short-pulse type and a long-pulse type, calculate a number of groups in each type, and determine whether a radar signal exists based on the number of groups in each type.

The analysis block may include a determination block configured to determine whether the plurality of pulses meet a first standard, an operation block configured to classify the plurality of pulses into the groups according to the pulse widths based on a result of determination by the determination block and perform a first averaging operation, a second averaging operation, a missing pulse count operation, and a group count operation, a filter configured to filter the plurality of pulses and the groups based on the result of the determination by the determination block, and a compensation block configured to compensate for missing pulses based on the result of the determination by the determination block.

The first standard may include a pulse width comparison reference, a pulse repetition interval comparison reference, a missing pulse count reference, a group pulse count reference, and a group count reference.

The filter may filter the plurality of pulses based on pulse widths of radar regulation pulses according to types of radar pulses and may filter the groups based on the number of pulses in each group.

The compensation block may compensate for the missing pulses based on the number of missing pulses during a pulse repetition interval for each group.

The determination block may generate a new group based on the number of missing pulses during a pulse repetition interval for each group.

The plurality of pulses may include a short pulse and a long pulse.

The groups may include a single short-pulse group and at least one long-pulse group.

One or more embodiments may be realized by providing a wireless transceiver, including a radar signal detection module, including a pulse collection block configured to collect and store a plurality of pulses, a control block configured to control the pulse collection block to collect the plurality of pulses based on a reference time or a reference pulse collection count, and an analysis block configured to classify the plurality of pulses into groups based on pulse widths of the pulses, classify the filtered groups into a short-pulse type and a long-pulse type, calculate a number of groups in each type, and determine whether a radar signal exists based on the number of groups in each type, and a processor configured to change a channel in response to a control signal generated by the radar signal detection module.

The transceiver may be a multi-input multi-output (MIMO) wireless transceiver

BRIEF DESCRIPTION OF THE DRAWINGS

Features will become more apparent to those of ordinary skill in the art by describing in detail exemplary embodiments with reference to the attached drawings, in which:

FIG. 2 illustrates a block diagram of an exemplary embodiment of the radar signal detection module illustrated in FIG. 1B;

FIG. 3 illustrates a flowchart of an exemplary method of detecting a radar signal;

FIG. 5B illustrates a diagram for explaining in detail the pulse filtering process of in FIG. 5A;

FIG. 6A illustrates a flowchart of an exemplary pulse grouping process employable by the detection method illustrated in FIG. 3;

FIG. 6B illustrates a diagram for explaining in detail the pulse grouping process illustrated in FIG. 6A;

FIG. 8B illustrates a diagram for explaining in detail the compensating operation illustrated in FIG. 8A;

FIG. 10 illustrates a flowchart of an exemplary radio signal existence determining process employable by the detection method illustrated in FIG. 3.

DETAILED DESCRIPTION

Korean Patent Application No. 10-2009-0126075, filed on Dec. 17, 2009, in the Korean Intellectual Property Office, and entitled: "Method of Detecting Radar Signal," is incorporated by reference herein in its entirety.

Exemplary embodiments will be described more fully hereinafter with reference to the accompanying drawings, in which embodiments of the invention are shown. Aspects may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout the specification.

It will be understood that, unless specified otherwise, when an element is referred to as being "connected" to another element, it can be directly connected to the other element or intervening elements may be present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 1A:
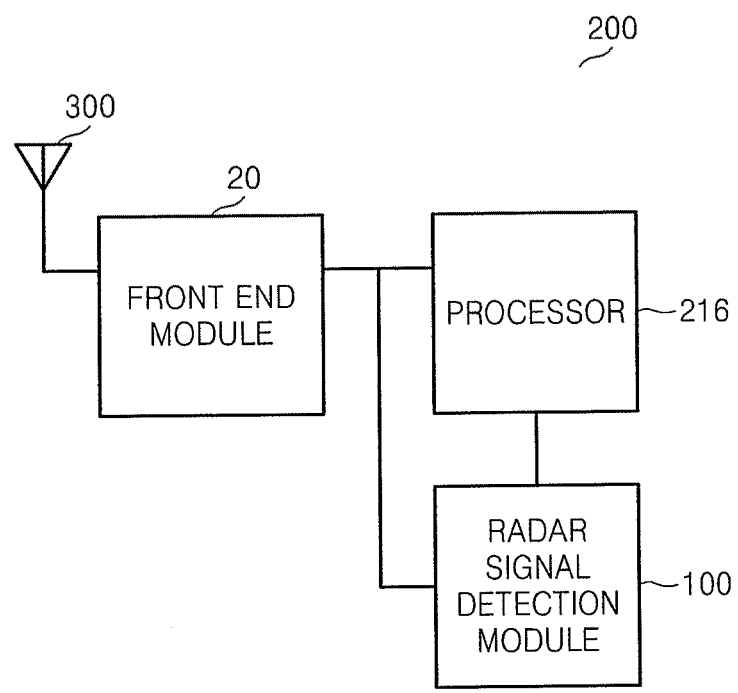
FIG. 1A illustrates a block diagram of an exemplary embodiment of a wireless transceiver including an exemplary embodiment of a radar signal detection module.

FIG. 1A illustrates a block diagram of an exemplary embodiment of a wireless transceiver 200 including an exemplary embodiment of a radar signal detection module 100. Referring to FIG. 1A, the wireless transceiver 200 may include an antenna 300, a front end module 20, a processor 216, and the radar signal detection module 100.

A radio frequency (RF) signal received by the antenna 300 may be input to the front end module 20. The front end module 20 may amplify the RF signal, mix the RF signal with other signals, and/or filter the RF signal, before converting it into a digital signal. The front end module 20 may output the digital signal to the processor 216 and the radar signal detection module 100.

The radar signal detection module 100 may receive the digital signal and may detect a radar signal. When the radar signal is detected, the radar signal detection module 100 may control the processor 216 to change a current communication channel to another channel that does not interfere with the detected radar signal.

Figure 1B:
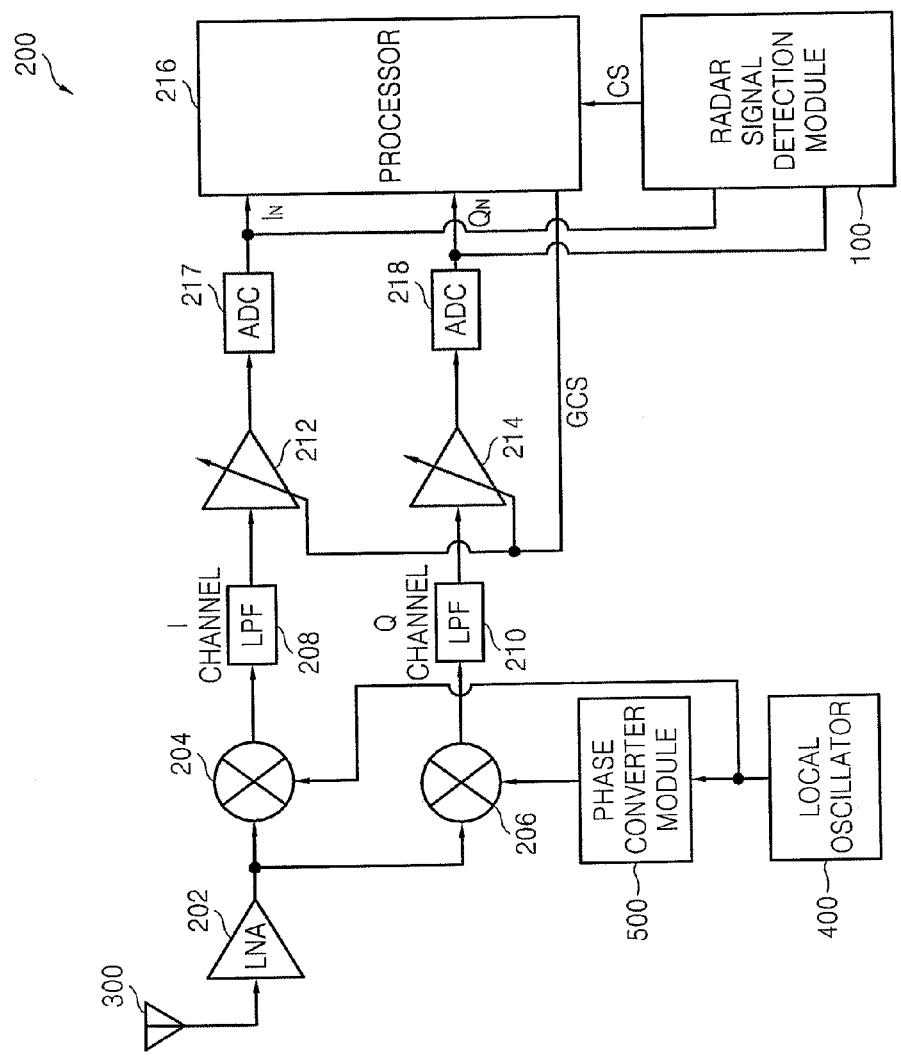
FIG. 1B illustrates a schematic diagram of the exemplary wireless transceiver including the radar signal detection module illustrated in FIG. 1A.

FIG. 1B illustrates a schematic diagram of the exemplary wireless transceiver 200 including the radar signal detection module 100 illustrated in FIG. 1A. Referring to FIG. 1B, the wireless transceiver 200 may include the antenna 300, a low-noise amplifier (LNA) 202, a first mixer 204, a second mixer 206, a first low-pass filter (LPF) 208, a second LPF 210, a first variable gain amplifier 212, a second variable gain amplifier 214, a first analog-to-digital converter (ADC) 217, a second ADC 218, the processor 216, a local oscillator 400, a phase converter module 500, and the radar signal detection module 100. The wireless transceiver 200 may be, e.g., a multi-input multi-output (MIMO) wireless transceiver.

Referring to FIG. 1B, an RF signal received by the antenna 300 may be input to the LNA 202. The LNA 202 may amplify the RF signal and may output the RF signal to the first mixer 204 and the second mixer 206.

The first mixer 204 may mix the RF signal with a local oscillation signal output from the local oscillator 400. The first mixer 204 may down-convert the RF signal into a low-frequency signal, e.g., baseband frequency or intermediate frequency signal, and may generate a down-converted in-phase (I) channel signal. The second mixer 206 may mix the RF signal with a phase-shifted local oscillation signal output from the phase converter module 500 and may generate a down-converted quadrature (Q) channel signal. The down-converted Q channel signal may be a low-frequency, e.g., baseband frequency or intermediate frequency signal.

The phase converter module 500 may receive the local oscillation signal from the local oscillator 400 and may output a local oscillation signal having, e.g., a 90-degree shifted phase.

The first LPF 208 may receive the down-converted I channel signal. The first LPF 208 may output a filtered I channel signal to the first variable gain amplifier 212. The second LPF 210 may receive the down-converted Q channel signal. The second LPF 210 may output a filtered Q channel signal to the second variable gain amplifier 214.

The first variable gain amplifier 212 and the second variable gain amplifier 214 may receive the filtered I channel signal and the filtered Q channel signal, respectively, and may each change a gain in response to a gain control signal GCS from the processor 216. The first ADC 217 and the second ADC 218 may receive output signals of the first and second variable gain amplifiers 212 and 214, respectively, may convert the output signals of the first and second variable gain amplifiers 212 and 214 into digital signals, and may output the digital signals to the processor 216.

The radar signal detection module 100 may be connected to output terminals of the first ADC 217 and the second ADC 218. The radar signal detection module 100 may detect existence or non-existence of a radar signal. When a radar signal is detected, the radar signal detection module 100 may output a control signal CS to the processor 216. When the radar signal detection module 100 outputs a control signal CS to the processor 216, the processor 216 may change a current communication channel to another channel that does not interfere with the radar signal.

FIG. 2 illustrates a block diagram of an exemplary embodiment of the radar signal detection module 100 illustrated in FIG. 1B. The radar signal detection module 100 may include a pulse collection block 110, a control block 120, and an analysis block 130.

The pulse collection block 110 may collect and store a plurality of pulses of signals output from the output terminals of the first and second ADCs 217, 218. The collected pulses may be grouped based on characteristics of the pulses. The collected pulses may include short pulses having a relatively short width and long pulses having a relatively long pulse width. For example, the collected pulses may be grouped based on pulse width, as short pulses, e.g., within a predetermined short width range, and long pulses, e.g., within a predetermined long width range. The pulses may be grouped based on pulse characteristic information. The collected pulses may include information such as arrival time, pulse width, pulse repetition interval, etc.

The control block 120 may control the pulse collection block 110 to collect pulses based on a reference time (e.g., a predetermined pulse collection time) or a reference pulse collection count. The reference pulse collection count is a predetermined number of collected pulses and may be 2 or an integer greater than 2. For example, when the reference time is set to 1000 μsec, the control block 120 may control the pulse collection block 110 to collect and store pulses for 1000 μsec. For example, when the reference pulse collection count is set to 10, the control block 120 controls the pulse collection block 110 to collect and store 10 pulses.

After a plurality of pulses are collected, the analysis block 130 may analyze information about the pulses collected in the pulse collection block 110, may determine whether a radar signal exists, and may output the control signal CS to the processor 216 when the radar signal is determined to exist. At this time, the information about the pulses may include a pulse width and a pulse repetition interval.

In embodiments, instead of individually analyzing a pulse when it arrives (or is received), a plurality of pulses may be collected in the pulse collection block 110 and the plurality of collected pulses may be analyzed when the reference time or the reference pulse collection count is met. As a result, embodiments may enable a burden on a pulse detection device or system to be reduced.

The analysis block 130 may include a determination block 131, an operation block 132, a filter 133, and a compensation block 134. The determination block 131 may determine detection or non-detection of a radar signal in association with the operation block 132, the filter 133, and the compensation block 134.

The determination block 131 may determine whether the pulses meet a first standard including at least one predetermined reference, e.g., a pulse width reference and/or a pulse repetition interval reference. The determination block 131 may output the control signal CS to the processor 216 when it is finally determined that a radar signal has been detected. The first standard may include a pulse width comparison reference set based on comparison between widths of the plurality of pulses and widths of radar regulation pulses according to the types of radar pulses, a pulse repetition interval comparison reference set based on comparison between repetition intervals of the plurality of pulses and repetition intervals of the radar regulation pulses according to the types of radar pulses, a missing pulse count reference set based on a number of missing pulses in the plurality of pulses, a group pulse count reference set based on a number of pulses in a group, and a group count reference set based on a number of groups.

The operation block 132 may classify the plurality of pulses into groups based on a result of the determination by the determination block 131. For instance, the pulse widths of pulses may be determined and pulses with similar pulse widths may be classified into the same group. At this time, the pulses may be classified, e.g., into a single short-pulse group and at least one long-pulse group.

The operation block 132 may perform a first averaging operation of averaging in each group values corresponding to a reference (e.g., a pulse width) by which the pulses are classified into groups, a second averaging operation of averaging values corresponding to at least one information (e.g., a pulse repetition interval) about the pulses in each group, a missing pulse count operation related with the number of missing pulses during the pulse repetition interval, and/or a group count operation related with the number of groups according to the types of pulses.

The determination block 131 may generate an additional group based on the number of missing pulses. For instance, when the number of missing pulses is 5 and a reference value is 4, since the number of missing pulses is one more than the reference value, a pulse arriving after the pulse repetition interval may be considered to belong to another group, and therefore, an additional group may be generated.

The filter 133 may filter the plurality of pulses or the groups based on a result of the determination by the determination block 131. For instance, the filter 133 may filter the plurality of pulses according to a determination made based on the pulse widths of radar regulation pulses (e.g., Federal Communications Commission (FCC) regulation pulses or European Telecommunications Standard Institute (ETSI) regulation pulses) according to the types of radar pulses. The filter 133 may filter the groups according to determination based on the number of pulses in each group.

The compensation block 134 may compensate for missing pulses in the plurality of pulses based on determination by the determination block 131. For example, the compensation block 134 may recognize occurrence of pulse loss based on determination that a missing pulse exists in a pulse repetition interval of a group and that a number of missing pulses is less than the reference value. When the compensation block 134 recognizes the occurrence of pulse loss, the compensation block 134 may perform pulse compensation. For example, when the number of missing pulses is 3 and the reference value is 4, i.e., the number of missing pulses is less than the reference value, and therefore, the compensation block 134 may perform pulse compensation.

FIG. 3 illustrates a flowchart of an exemplary method of detecting a radar signal. The method illustrated in FIG. 3 may be performed by the radar signal detection module 100 illustrated in FIGS. 1A and 1B.

Referring to FIG. 3, during S100, the radar signal detection module 100 may collect a plurality of pulses. During S200, the radar signal detection module 100 may filter the plurality of pulses based on a range of pulse widths of radar regulation pulses with respect to predetermined pulses, e.g., all types of radar pulses.

During S300, the radar signal detection module 100 may classify the filtered pulses into groups based on pulse widths, e.g., filtered pulses having similar pulse widths may be classified together. At this time, the radar signal detection module 100 may calculate an average of pulse widths and may store an average pulse width for each group.

During S400, the radar signal detection module 100 may analyze pulses in each group. At this time, the radar signal detection module 100 may filter some of the pulses in each group according to a range of pulse repetition intervals for a radar regulation pulse type corresponding to the pulse width of the group or may calculate and store an average of the pulse repetition intervals.

During S500, the radar signal detection module 100 may analyze a number of missing pulses in a pulse repetition interval of each group and may compensate for missing pulses. During S600, the radar signal detection module 100 may average the pulse widths and the pulse repetition intervals for each group and may filter some of the groups based on the number of pulses in each group. During S700, the radar signal detection module 100 may classify the groups by types, e.g., a short-pulse type, a long-pulse type, etc., and may determine whether a radar signal exists based on the number of groups for each type.

Figure 4:
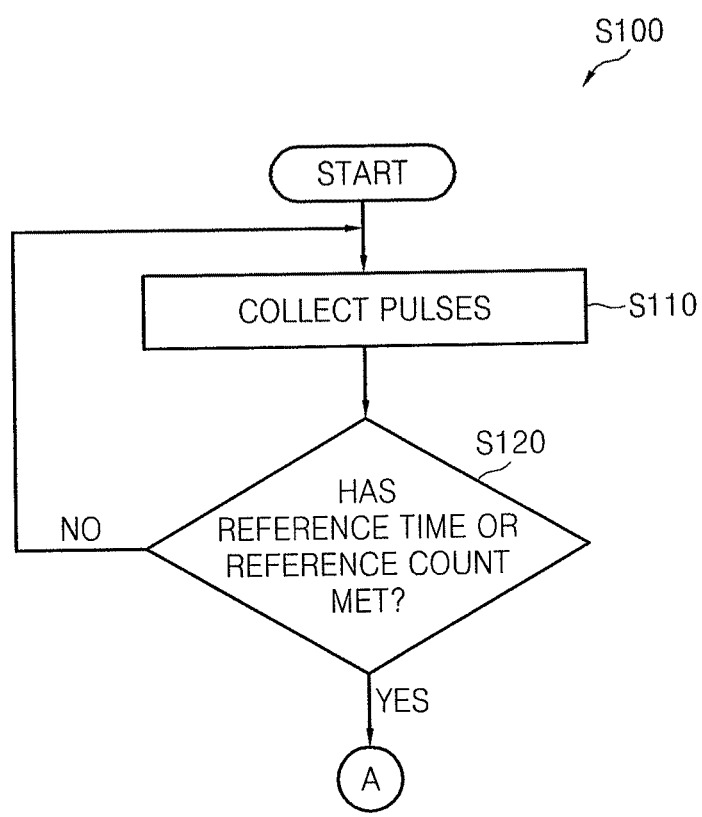
FIG. 4 illustrates a flowchart of an exemplary pulse collecting process employable by the detection method illustrated in FIG. 3.

FIG. 4 illustrates a flowchart of an exemplary pulse collecting process S100 of FIG. 3. Referring to FIG. 4, during S110, the pulse collection block 110 may collect and store the plurality of pulses. During S120, the control block 120 may control the pulse collection block 110 to collect the plurality of pulses based on a reference time or a reference pulse collection count. More particularly, e.g., the control block 120 may control the pulse collection block 110 and may collect the plurality of pulses only during the reference time or may control the pulse collection block 110 to stop collecting pulses when the plurality of pulses corresponding to the reference pulse collection count have been collected.

Figure 5A:
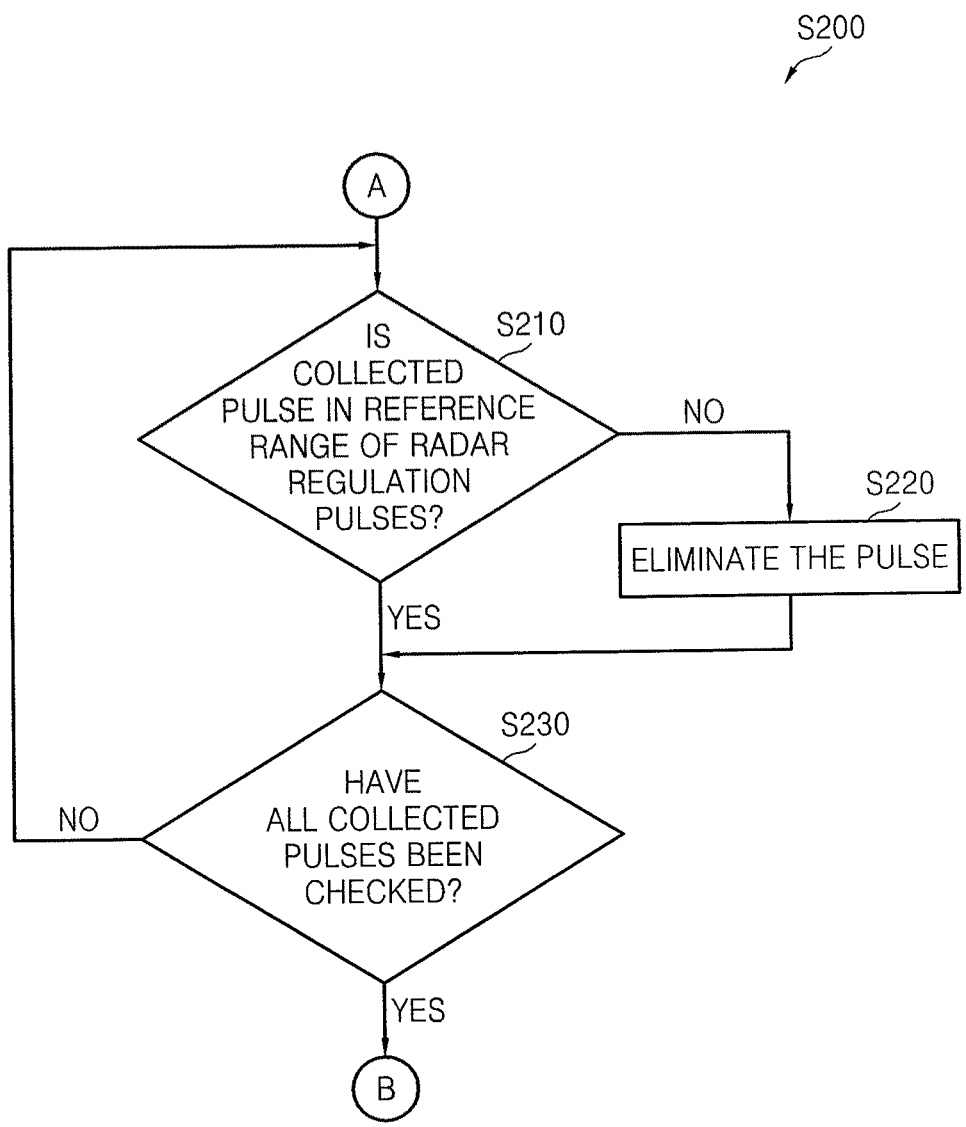
FIG. 5A illustrates a flowchart of an exemplary pulse filtering process employable by the detection method illustrated in FIG. 3.

FIG. 5A illustrates a flowchart of an exemplary filtering pulse process S200 of FIG. 3. Referring to FIG. 5A, during S210, the determination block 131 may determine whether a collected pulse is in a reference range of radar regulation pulses with respect to predetermined pulses, e.g., all types of radar pulses. During S220, when the collected pulse is not in the reference range of radar regulation pulses, the pulse may be eliminated by the filter 133. During S230, the determination block 131 may determine whether all of the collected pulses have undergone process S210.

FIG. 5B illustrates a diagram for explaining in detail the filtering pulse process S200 of FIG. 3. More particularly, FIG. 5B shows an example of pulses collected in the pulse collection block 110. A pulse P1 and a pulse P2 have pulse widths of 0.5 μsec and 150 μsec, respectively, and are not in a predetermined range of pulse widths, e.g., within a range of 10 μsec to 100 μsec corresponding to pulse widths of radar regulation pulses with respect to all radar pulse types. Accordingly, the pulses P1 and P2 are eliminated by the filter 133.

FIG. 6A illustrates a flowchart of an exemplary classifying pulses into the groups process S300 of FIG. 3. Referring to FIG. 6A, during S310, the determination block 131 may determine whether the filtered pulses have similar pulse widths, e.g., within a predetermined range, and the operation block 132 may classify the pulses into groups based on a similarity of pulse widths among the pulses. During S320, the operation block 132 may average pulse widths of pulses in each group.

FIG. 6B illustrates a diagram for explaining in detail the classifying pulses into groups process S300 of FIG. 3. Referring to FIG. 6B, the pulses may be classified into groups based on similarity of pulse width. More particularly, e.g., referring to the example of FIG. 6B, pulses having pulse widths close to 10 μsec are classified into a group G1. Pulses having pulse widths close to 20 μsec are classified into a group G2. Pulses having pulse widths close to 50, 90, 70, 100 and 60 μsec are classified into groups G3, G4, G5, G6, and G7, respectively.

Figure 7:
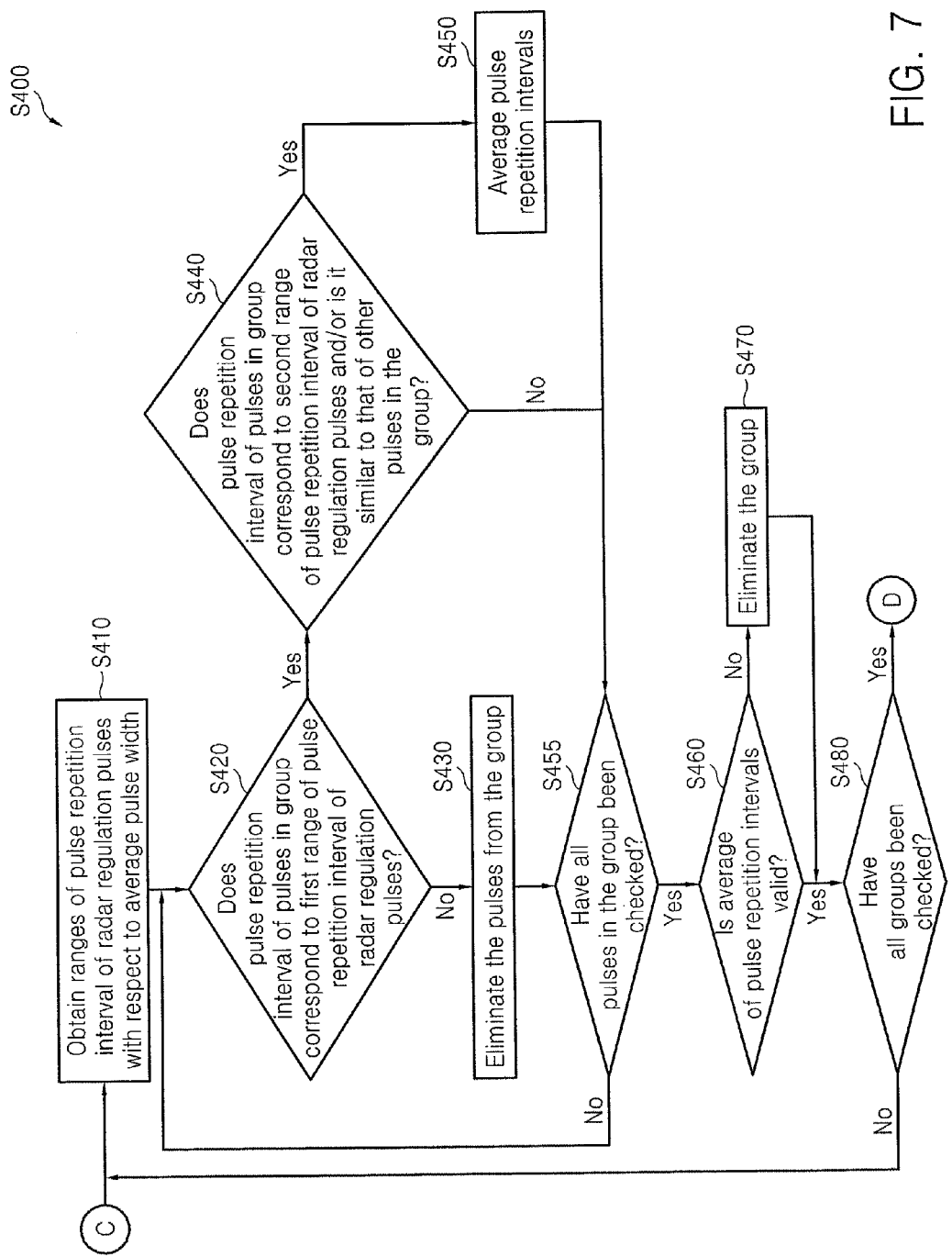
FIG. 7 illustrates a flowchart of an exemplary group analyzing process employable by the detection method illustrated in FIG. 3.

FIG. 7 illustrates a flowchart of the analyzing groups process S400 of FIG. 3. Referring to FIG. 7, during S410, the determination block 131 may obtain ranges of a pulse repetition interval of radar regulation pulses with respect to an average pulse width for each group. During S420, the determination block 131 may determine whether a pulse repetition interval of two adjacent pulses in the group corresponds to a first range (e.g., a minimum value) of the pulse repetition interval of the radar regulation pulses. During S430, when the pulse repetition interval of the pulses in the group does not correspond to the first range, the pulses may be eliminated from the group by the filter 133. During S440, when the pulse repetition interval of the pulses in the group corresponds to the first range, the determination block 131 may determine whether the pulse repetition interval of the pulses in the group corresponds to a second range (e.g., a maximum value) of the pulse repetition interval of the radar regulation pulses and/or whether the pulse repetition interval of the pulses in the group is similar to that of other pulses in the group. During S450, when one or more of the determinations made during S440 is determined to be true, the operation block 132 may average pulse repetition intervals of the pulses in the group.

During S455, the determination block 131 may determine whether all pulses in the group have undergone process S420. During S455, when it is determined that all the pulses in the group have not undergone process S420, the method returns to process S420. When it is determined that all the pulses in the group have undergone process S420, during S460, the determination block 131 may determine whether an average of the pulse repetition intervals is valid. When it is determined that it is not valid, during S470, the filter 133 may eliminate the group. During S480, the determination block 131 may determine whether all groups have undergone operations S410 through S470.

Figure 8A:
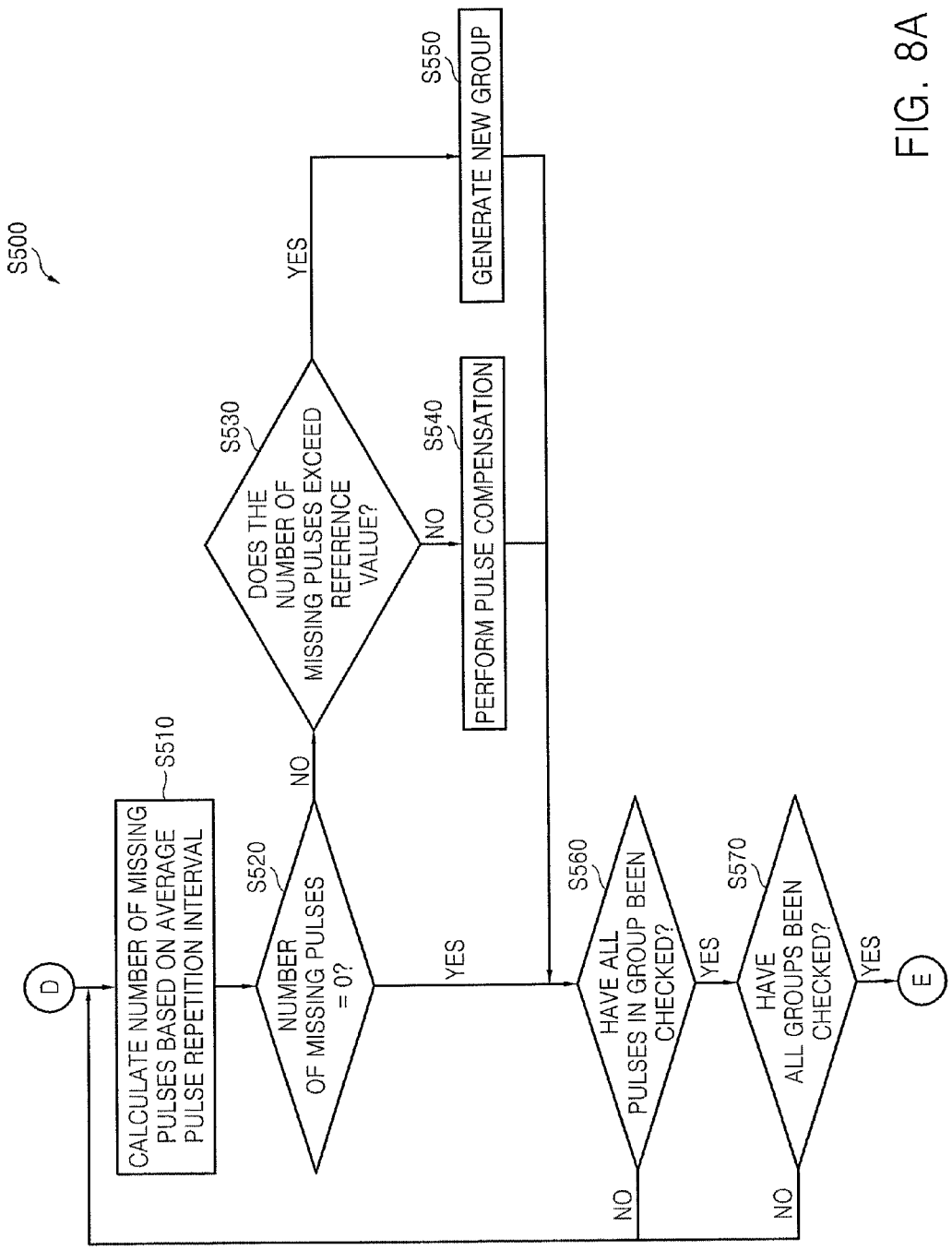
FIG. 8A illustrates a flowchart of an exemplary compensating process employable by the detection method illustrated in FIG. 3.

FIG. 8A illustrates a flowchart of an exemplary compensating for missing pulses process S500 of FIG. 3. Referring to FIG. 8A, during S510, the operation block 132 may calculate the number of missing pulses based on the average of the pulse repetition intervals. During S520, the determination block 131 may determine whether the number of missing pulses is 0. When it is determined that the number of missing pulses is not 0, during S530, the determination block 131 may determine whether the number of missing pulses exceeds a reference value (or a maximum threshold value). When it is determined that the number of missing pulses exceeds the reference value, during S550, the determination block 131 may generate a new group having a current pulse as a start pulse. When it is determined that the number of missing pulses does not exceed the reference value, during S540, the compensation block 134 may determine that pulse missing has occurred and compensate for the missing pulses.

During S560, the determination block 131 may determine whether all pulses in a group have been checked. During S570, the determination block 131 may determine whether all groups have been checked.

FIG. 8B illustrates a diagram for explaining in detail the compensating for missing pulses process S500 of FIG. 3. Referring to FIG. 8B, pulse compensation may be performed based on the number of missing pulses. In a case where the reference value is 2, when the number of missing pulses is 2, pulses may be regarded as missing and may be compensated for. When the number of missing pulses is 3, i.e., a value exceeding the reference value of 2, a new group may be additionally generated.

Figure 9:
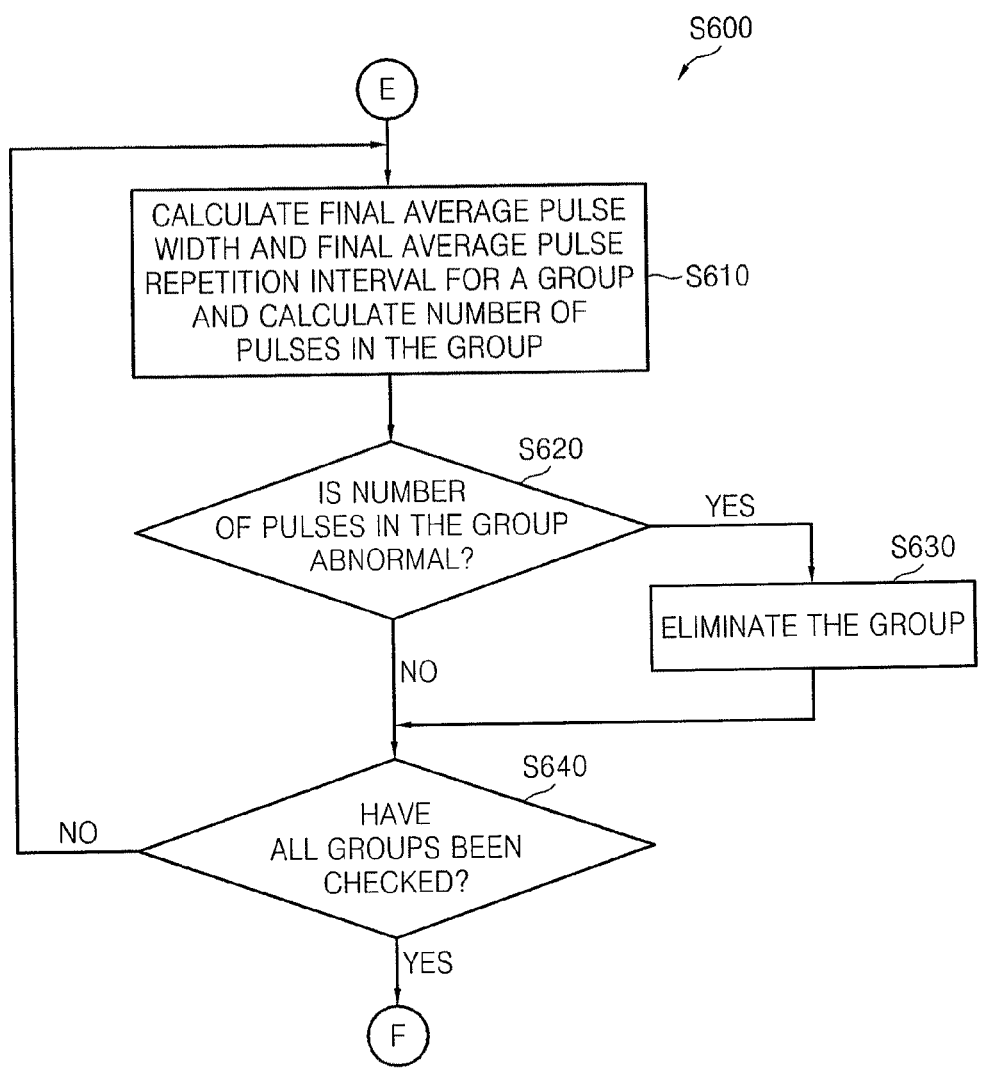
FIG. 9 illustrates a flowchart of a group filtering process employable by the detection method illustrated in FIG. 3.

FIG. 9 illustrates a flowchart of the filtering groups process S600 of FIG. 3. Referring to FIG. 9, during S620, the operation block 132 may calculate a final average pulse width and a final average pulse repetition interval for a group based on a result obtained during process S500 and may calculate the number of pulses in the group.

Next, during S620, the determination block 131 may determine whether the number of pulses in the group is abnormal. During S630, when it is determined that the number of pulses in the group is abnormal, the group may be eliminated by the filter 133. During S640, the determination block 131 may determines whether all of the groups have been checked.

FIG. 10 illustrates a flowchart of the determining if radar signal exists process S700 of FIG. 3. Referring to FIG. 10, during S710, the operation block 132 may classify all the groups by types, e.g., a short-pulse type and a long-pulse type, and may calculate the number of groups in each type in process S710. The determination block 131 may determine whether the number of groups in each type corresponds to a reference range in process S720. When it is determined that the number of groups in each type corresponds to the reference range, during S370, the determination block 131 may determine that the radar signal has been detected.

Aspects described herein may be embodied in hardware, software, firmware or combination thereof. When the method is embodied in software, it can be embodied as computer readable codes or programs on a computer readable recording medium, e.g. a tangible, non-transitory recording medium. The computer readable recording medium is any data storage device that can store data which can be thereafter read by a computer system. Examples of the computer readable recording medium may includes read-only memory (ROM), random-access memory (RAM), electrically erasable programmable ROM (EEPROM), and flash memory.

As described above, according to some embodiments, pulse widths and/or pulse repetition intervals of received pulses may be analyzed and whether a radar signal exists may be determined based on the analysis result. When it is determined that the radar signal exists, a current channel may be changed to another channel to avoid the radar signal.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A method of detecting a radar signal using a transceiver, the method comprising:
   collecting a plurality of pulses received by the transceiver based on a reference time or a reference pulse collection count;
   classifying the plurality of pulses into groups based on pulse widths of the plurality of pulses;
   analyzing pulses in each of the groups after classifying the plurality of pulses into the groups, wherein analyzing the pulses in each of the groups includes analyzing the pulses based on a number of missing pulses in each group;
   generating a new group based on the analysis of the pulses in each group;
   classifying the groups into a short-pulse type and a long-pulse type and calculating a number of groups in each type; and
   determining whether a radar signal exists based on the number of groups in each type.

2. The method as claimed in claim 1, further comprising:
filtering the plurality of pulses according to a pulse filtering reference before classifying the plurality of pulses into the groups.

3. The method as claimed in claim 2, further comprising compensating for missing pulses in each group based on the analysis of the pulses in each group.

4. The method as claimed in claim 3, further comprising filtering the groups, into which the plurality of pulses are classified into based on similarity of the pulse widths, according to a group filtering reference.

5. The method as claimed in claim 2, further comprising averaging pulse widths for each of the groups after the classifying the plurality of pulses into the groups based on similarity of the pulse widths of the pulses.

6. The method as claimed in claim 2, wherein analyzing the pulses in each of the groups further comprises analyzing the pulses based on a pulse repetition interval of radar regulation pulses.

7. A non-transitory recording medium for recording a computer program for executing the method of claim 1.

8. A method of detecting a radar signal using a transceiver, the method comprising:
   collecting a plurality of pulses received by the transceiver based on a reference time or a reference pulse collection count;
   filtering the plurality of pulses according to a pulse filtering reference;
   classifying the filtered pulses into groups based on similarity of pulse width;
   averaging pulse widths for each of the groups after classifying filtered pulses into the groups based on similarity of the pulse widths of the filtered pulses;
   filtering the groups according to a group filtering reference in accordance with averaged pulse widths;
   classifying the filtered groups into a short-pulse type and a long-pulse type and calculating a number of groups in each type; and
   determining whether a radar signal exists based on the number of groups in each type.

* * * * *